US007671152B2

(12) United States Patent
Parker et al.

(10) Patent No.: US 7,671,152 B2
(45) Date of Patent: Mar. 2, 2010

(54) SURFACTANTLESS SYNTHESIS OF AMPHIPHILIC CATIONIC BLOCK COPOLYMERS

(75) Inventors: Dane Kenton Parker, Coshocton, OH (US); Joseph John Kulig, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 629 days.

(21) Appl. No.: 11/583,424

(22) Filed: Oct. 19, 2006

(65) Prior Publication Data

US 2007/0149709 A1    Jun. 28, 2007

Related U.S. Application Data

(60) Provisional application No. 60/753,132, filed on Dec. 22, 2005.

(51) Int. Cl.
*C08F 2/00*    (2006.01)
*C08F 236/00*    (2006.01)

(52) U.S. Cl. .................. 526/204; 526/214; 526/222; 526/340

(58) Field of Classification Search .................. 526/220
See application file for complete search history.

(56) References Cited

U.S. PATENT DOCUMENTS

| 3,916,969 | A | * | 11/1975 | Auerbach et al. | ........... | 152/532 |
|---|---|---|---|---|---|---|
| 4,026,962 | A | * | 5/1977 | Lambla et al. | ............... | 526/201 |
| 6,992,156 | B2 | | 1/2006 | Parker et al. | ................. | 526/204 |
| 2002/0123588 | A1 | | 9/2002 | Adam et al. | ................. | 526/277 |
| 2004/0127634 | A1 | * | 7/2004 | Parker et al. | ................. | 524/571 |
| 2007/0072979 | A1 | * | 3/2007 | Moad et al. | .................. | 524/445 |

FOREIGN PATENT DOCUMENTS

WO    WO-2004/101627    * 11/2004

OTHER PUBLICATIONS yuan, Jian-Jun et al., Synthesis and Characterization of Polystyrene/ Poly(4-vinylpyridine) Triblock Copolymers by Reversible Addition-Fragmentation Chain Transfer Polymerization and Their Self-Assembled Aggregates in Water, Journal of Applied Polymer Science, vol. 89, Issue 4, p. 1017-1025.*
English translation of WO-2004/101627.*
Pages 399-404, "Batch Emulsion Polymerization of Styrene Stabilized by a Hydrophilic Macro-RAFT Agent," by Maggy Manguian, et al., Macromolecular, Rapid Communications, *WILEY-VCH Verlag GmbH & Co. KGaA*, published 2006.
Pages 1575-1580, "Influence of Temperature and Electrolytes on the Adsorption of Poly (ethylene oxide)—Poly (propylene oxide) Block Copolymer on Polystyrene Latex and on the Stability of the Polymer-Coated Particles," by Th. F. Tadros, et al., J. Phys. Chem., *American Chemical Society*, published 1980.
Pages 5922-5925, "Poly (alkyl methacrylate-b-sulfonated glycidyl methacrylate). A New Amphiphilic Polymeric Surfactant for the Preparation and Stabilization of Polymer Acrylic Latices in Aqueous Medium," by L. Leemans, et al., *American Chemical Society*, published 1991.
Pages 45-51, "Synthesis of Poly (p-methylstyrene)—graft-poly (oxyethylene) and Application as a Polymeric Surfactant in Emulsion Polymerization," by I. Piirma, et al., *British Polymer Journal*, 21, published 1989.
Pages 7459-7464, "Poly(2-vinylnaphthalene-alt-maleic acid)-graft-polystyrene as a Photoactive Polymer Micelle and Stabilizer for Polystyrene Latexes," by Ti Cao, et al., Macromolecules, *American Chemical Society*, published 1994.
Pages 1-12, "Graft copolymers as stabilizers for oil-in-water emulsions, Part 2. Preparation of the emulsions and the factors affecting their stability," by A. E. Cardenas-Valera, et al., Colloids and Surfaces, *Elsevier Science B.V.*, published 1995.
Pages 401-435, "Block Copolymers in Emulsion and Dispersion Polymerization," by Gerard Riess, et al., Macromolecular, Rapid Communications, *WILEY-VCH Verlag GmbH & Co. KGaA*, published 2004.
Pages 2278-2287, "Emulsion Polymerization of Styrene Using Conventional, Polymerizable, and Polymeric Surfactants. A Comparative Study," by D. Cochin, et al., Macromolecules, *American Chemical Society*, published 1997.

(Continued)

*Primary Examiner*—David Wu
*Assistant Examiner*—Elizabeth Eng
(74) *Attorney, Agent, or Firm*—John D. DeLong

(57) ABSTRACT

The present invention is directed to a method of producing an amphiphilic block copolymer, including the steps of:

(1) preparing a first aqueous polymerization medium which is comprised of
  (a) 4-vinylpyridine,
  (b) a trithiocarbonate RAFT agent, and an emulsifier, wherein the emulsifier is prepared in-situ within the aqueous polymerization medium by the reaction of a latent surfactant with a surfactant activator;

(2) polymerizing the 4-vinylpyridine within the first aqueous polymerization medium in the presence of a first free radical initiator to produce a poly(4-vinylpyridine);

(3) protonating the poly(4-vinylpyridine) to form a protonated poly(4-vinylpyridine) RAFT macroinitiator;

(4) preparing a second aqueous polymerization medium which is comprised of the protonated poly(4-vinylpyridine) RAFT macroinitiator and a monomer containing ethylenic unsaturation but is exclusive of a surfactant; and (5) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation.

10 Claims, No Drawings

OTHER PUBLICATIONS

Pages 881-886, "Preparation and Stability of Polystyrene Latexes Using Polysoaps as Emulsifiers," by Ya Jiang Yang, et al., *Eur. Polym, J.*, 28, published 1992.

Pages 99-111, "Functional Polymers for Colloidal Applications. V. Novel Behavior of Polymeric Emulsifiers in Emulsion Polymerization," by Ping-Lin Kuo, et al., *Journal of Polymer Science: Part A: Polymer Chemistry*, vol. 31, published 1993.

Pages 3-86, "Molecular Concepts, Self-Organisation and Properties of Polysoaps," by A. Laschewsky, *Advances in Polymer Science*, vol. 124, published 1995.

Pages 6763-6767, "Polysoaps," by Ulrich P. Strauss, *Polymeric Materials Encyclopedia*, J. Salamone Ed., vol. 9, published 1996.

Pages 614-616, "Surfactant-free synthesis of amphiphilic diblock copolymer nanoparticles via nitroxide-mediated emulsion polymerization," by Guillaume Delaittre, et al., *Chem. Comm.*, published 2005.

Pages 6577-6585, "Mechanism of Soap-Free Emulsion Polymerization of Styrene and 4-Vinylpyridine: Characteristics of Reaction in the Monomer Phase, Aqueous Phase, and Their Interface," by Henmel Ni, et al., Macromolecules, *American Chemical Society*, published 2001.

Pages 4679-4681, "Synthesis of Block Copolymers of 2- and 4-Vinylpyridine by RAFT Polymerization," by Anthony J. Convertine, et al., Macromolecules, *American Chemical Society*, published 2003.

Pages 4548-4550, "Polymerization of Spherical Poly(styrene-b-4-vinylpyridine) Vesicles to Giant Tubes," by Lichao Gao, et al., Macromolecules, *American Chemical Society*, published 2005.

Pages 1017-1025, "Synthesis and Characterization of Polystyrene/Poly(4-vinylpyridine) Triblock Copolymers by Reversible Addition-Fragmentation Chain Transfer Polymerization and Their Self-Assembled Aggregates in Water," by Jian-Jun Yuan, et al., Journal of Applied Polymer Science, *Wiley Periodicals, Inc.*, published 2003.

Pages 7580-7592, "Synthesis of New Amphiphilic Diblock Copolymers and Their Self-Assembly in Aqueous Solution," by Sebastian Garnier, et al., Macromolecules, *American Chemical Society*, published 2005.

\* cited by examiner

SURFACTANTLESS SYNTHESIS OF AMPHIPHILIC CATIONIC BLOCK COPOLYMERS

CROSS REFERENCE TO OTHER APPLICATIONS

This Application claims the benefit of Ser. No. 60/753,132 filed Dec. 22, 2005.

BACKGROUND OF THE INVENTION

A typical mixture in emulsion polymerization consists of water, monomer(s), an initiator (usually water-soluble) and an emulsifier. The role of the emulsifier is critical and multifaceted. Initially it serves to form and stabilize an emulsion of the starting materials. Later, some of the initial micelles and/or emulsified droplets serve as the locus for polymer particle nucleation. Lastly, the emulsifier serves in the stabilization of the final latex. Most commonly, the emulsifier is a low molar mass surfactant, however, variations include systems such as "emulsifier-free" recipes wherein the surfactants are created in-situ. This is accomplished by either copolymerization of a hydrophilic co-monomer or by oligomerization of the hydrophobic monomer by a hydrophilic, generally an ionic initiator fragment. Additionally, copolymerizable surfactants have been used as well and represent a middle ground between classical and emulsifer-free systems.

As an alternative to the previously discussed systems are polymeric surfactants. Many different molecular architectures are possible with polymeric surfactants such as amphiphilic block and graft copolymers which contain hydrophobic and hydrophilic segments, and "polysoaps" which consist of polymerized reactive surfactants. Polysoaps in many ways are similar to polyelectrolytes in that both are charged polymeric species. The primary difference between them is that the reduced specific viscosity of polysoaps in aqueous solution is far lower than that of normal polyelectrolytes of comparable molecular weight. This critical difference is due to the compact molecular structure of polysoaps attributed to intramolecular micelle formation. These micelles have the ability to solublize hydrocarbons but unlike conventional surfactants, no critical micelle concentration is required. Typical polyelectrolytes such as poly(4-vinylpyridine) can transition to a polysoap by alkylation of a portion of the pyridine groups with dodecyl bromide. The dodecyl groups then undergo intramolecular aggregation due to hydrophobic attraction resulting in micelle formation and a sharp drop in intrinsic viscosity.

The use of block copolymers as polymeric surfactants in emulsion and dispersion polymerization has a long history. The practical challenge has been to develop simple, economical synthetic techniques to "tailor-make" the precise molecular characteristics required of block copolymer surfactants. This goal is now being realized by the remarkable progress made in recent years by controlled free radical polymerization (CFRP) such as reversible addition-fragmentation chain transfer (RAFT). With CFRP, block copolymers of defined structure, molecular weight and polydispersity are becoming commonplace. Many block copolymers formed in this way have already been demonstrated to function as polymeric surfactants for emulsion polymerization.

While many examples of emulsion polymerizations carried out with both polysoaps and block copolymeric surfactants exist, we have found only one example where a polyelectroyte homopolymer could be directly used in an aqueous solution to prepare a self-stablizing block copolymer latex using one or more relatively hydrophobic free-radically polymerizable monomers in the presence of an initiator without the aid of additional surfactant. This example doesn't use a RAFT system but rather a nitroxide-mediated (NMP) controlled free radical technique based on a water soluble alkoxyamine initiator. The NMP initiator is first used to prepare an aloxyamine-terminated poly(arcylic acid) macroinitiator with a defined molecular weight and polydispersity by solution free radical polymerization at 120° C. The poly (acrylic acid) macroinitiator is then dissolved at room temperature in aqueous sodium hydroxide solution to obtain the polyelectrolyte macroinitiator; alkoxyamine-terminated poly (sodium acrylate). Addition of either styrene or butyl acrylate to the aqueous solution yields an unstable biphasic system. However, heating this stirred mixture to 120° C. for 8 hrs under nitrogen produced stable latexes with over 90 percent monomer conversion. It is also important to realize that the latexes produced by this technique are anionically stabilized by surface negative charges.

The primary disadvantages of this system are the synthesis of the required alkoxyamine and the temperature of polymerization being above the boiling point of water.

SUMMARY OF THE INVENTION

The present invention is directed to a method of producing an amphiphilic block copolymer, comprising the steps of:
(1) preparing a first aqueous polymerization medium which is comprised of
   (a) 4-vinylpyridine,
   (b) a trithiocarbonate RAFT agent, and an emulsifier, wherein the emulsifier is prepared in-situ within the aqueous polymerization medium by the reaction of a latent surfactant with a surfactant activator;
(2) polymerizing the 4-vinylpyridine within the first aqueous polymerization medium in the presence of a first free radical initiator to produce a poly(4-vinylpyridine);
(3) protonating the poly(4-vinylpyridine) to form a protonated poly(4-vinylpyridine) RAFT macroinitiator;
(4) preparing a second aqueous polymerization medium which is comprised of the protonated poly(4-vinylpyridine) RAFT macroinitiator and a monomer containing ethylenic unsaturation but is exclusive of a surfactant; and
(5) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation.

DESCRIPTION OF THE INVENTION

In one aspect, the present invention is directed toward the surfactant-free synthesis of amphiphilic block copolymers cationic latexes (stabilized by surface positive charges) using a RAFT macroinitiator system and temperatures below 100° C.

More specifically, the ability to perform this type emulsion copolymerization with a polyelectroyte derived from protonated poly-(4-vinylpyridine); [P-(4-VP+)] RAFT macroinitiator and free radically polymerizable monomers is unknown. While there are a limited number of references to the CFRP polymerization of 4-vinylpyridine and its copolymerization with styrene, there appear to be no references demonstrating the RAFT copolymerization of protonated 4-VP monomer with styrene or any other monomers to yield stable surfactantless latexes.

Amphiphilic block copolymers, which consist of a hydrophobic block that is water insoluble and a water-soluble hydrophilic block, are broadly referred to as "macrosurfactants". They have been investigated in a wide variety of applications such as rheology modifiers, emulsifers, stabilizing agents for latex, demulsifers, flocculants, controlled drug delivery and light harvesting systems.

One example of how such amphiphilic block copolymers can be prepared is shown as follows:

(3) protonating the poly(4-vinylpyridine) to form a protonated poly(4-vinylpyridine) RAFT macroinitiator;

(4) preparing a second aqueous polymerization medium which is comprised of the protonated poly(4-vinylpyridine) RAFT macroinitiator and a monomer containing ethylenic unsaturation but is exclusive of a surfactant; and (5) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation.

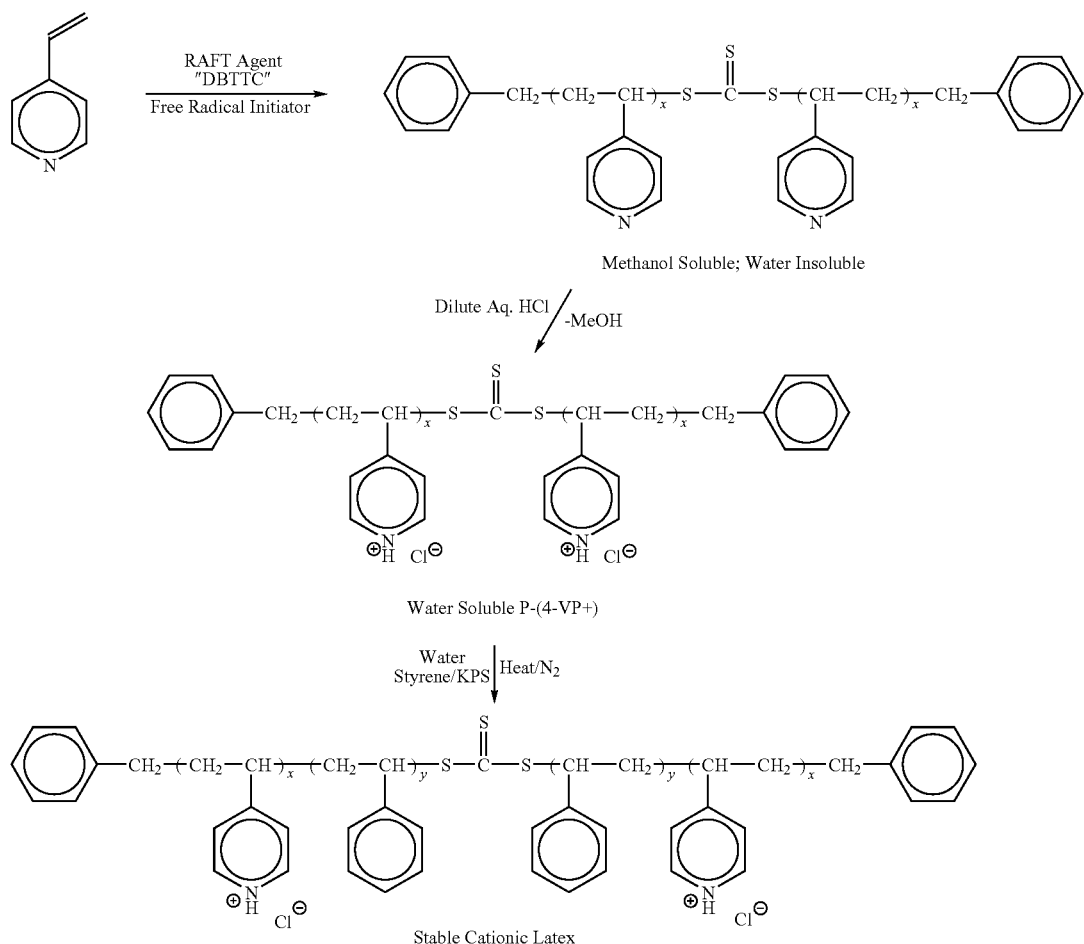

The present invention is therefore directed to a method of producing an amphiphilic block copolymer, comprising the steps of:

(1) preparing a first aqueous polymerization medium which is comprised of
  (a) 4-vinylpyridine,
  (b) a trithiocarbonate RAFT agent, and an emulsifier, wherein the emulsifier is prepared in-situ within the aqueous polymerization medium by the reaction of a latent surfactant with a surfactant activator;

(2) polymerizing the 4-vinylpyridine within the first aqueous polymerization medium in the presence of a first free radical initiator to produce a poly(4-vinylpyridine);

The method of the present invention involves two RAFT controlled polymerizations, first, a RAFT controlled polymerization of 4-vinylpyridine following by protonation to produce a protonated poly(4-vinylpyridine) RAFT macroinitiator, and second, a RAFT controlled polymerization of the protonated poly(4-vinylpyridine) RAFT macroinitiator with a second monomer containing ethylenic unsaturation to produce an amphiphilic block copolymer.

The RAFT controlled polymerizations can be a batch, semi-batch, or continuous process which provides excellent control of the polymer composition and morphology. The controlled polymerization will normally be carried out as an emulsion polymerization process.

In the RAFT controlled polymerization of 4-vinylpyridine, a trithiocarbonate RAFT agent is used. Any of the trithiocarbonate RAFT agents as are known in the art may be used, for example, in one embodiment the trithiocarbonate RAFT agent may be as disclosed in U.S. patent application Ser. No. 10/721,718, fully incorporated herein by reference. In another embodiment, the trithiocarbonate RAFT agent is of the structural formula:

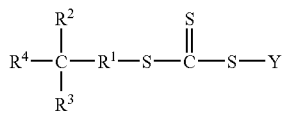

wherein $R^1$ is a divalent alkyl group of 1 to 12 carbon atoms, $R^2$ and $R^3$ are each independently hydrogen or an alkyl group of 1 to 12 carbon atoms, and $R^4$ is —OH or —COOH, with the proviso that the total carbon atoms of $R^1$, $R^2$, and $R^3$ is no greater than 12; and wherein Y represents a functional group that is capable of activating a vinylic carbon toward free radical addition.

In one embodiment, Y represents a functional group selected from the group consisting of —C(R')$_2$CN, —C(CH$_3$)$_2$ Ar, —C(CH$_3$)$_2$COOR", —C(CH$_3$)$_2$CONHR", —C(CH$_3$)$_2$CH$_2$C(CH$_3$), —CH(CH$_3$)Ar, —CH$_2$Ar, —C(CH$_3$)$_3$, —CR'$_2$COOH, —C(R')(CN)—(CH$_2$)$_n$—COOH, and —C(R')(CN)—(CH$_2$)$_n$—OH; wherein R' represents a linear or branched hydrocarbon containing from 1 to 12 carbon atoms; wherein Ar represents an unsubstituted or substituted phenyl, napthyl, anthracenyl, pyrenyl or pyridyl group; and wherein n represents an integer from 1 to 8.

In another embodiment, Y represents a function group selected from the group consisting of benzyl, picolyl, or t-butyl.

In another embodiment, $R^1$ is a divalent alkyl group of 1 to 4 carbon atoms, i.e., $R^1$ is (CH$_2$)$_m$ where m ranges from 1 to 4.

In another embodiment, $R^1$ is (CH$_2$)$_9$, $R^2$ and $R^3$ are hydrogen, $R^4$ is —COOH, Y is benzyl, and the free radical control agent is S-benzyl-S'-(11-undecanoic acid) trithiocarbonate.

In another embodiment, $R^1$ is CH$_2$, $R^2$ is (CH$_2$)$_8$, $R^3$ is hydrogen, $R^4$ is —OH, Y is benzyl, and the free radical control agent is S-benzyl-S'-(2-hydroxydecyl) trithiocarbonate.

In another embodiment, $R^1$ is CH$_2$, $R^2$ is (CH$_2$)$_8$, $R^3$ is hydrogen, $R^4$ is —OH, Y is 4-picolyl, and the free radical control agent is S-(4-picolyl)-S'-(2-hydroxydecyl) trithiocarbonate.

The RAFT controlled polymerization requires the presence of a free radical control agent to control the course of polymerization while minimizing undesirable side reactions, such as chain termination. The control agent has characteristics that depend greatly on the details of the polymerization, including the mechanism for polymerization, the types of monomers being used, the type of initiation, the solvent system and the reaction conditions. The control agent may be introduced into the emulsion system by many different methods, and the preferred method depends greatly on the particular embodiment being practiced. In some embodiments, the active control agent may be added directly to the reaction vessel in the form of a pure compound or as a component of a solution or mixture. In other embodiments, the active control agent may be generated in situ from chemical reactions occurring prior to, during or after emulsification.

Regardless of the method used to introduce or generate a control agent, the control agents suitable for the present invention offer one or more of the benefits associated with "living" polymerization kinetics. These benefits may include:

(1) a linear dependence of the degree of polymerization as a function of time;

(2) a linear dependence of the number-average molecular weight (Mn) on the extent of polymerization;

(3) a constant number of polymer molecules and active centers that is sensibly independent of conversion;

(4) a narrow molecular weight distribution, with Mw/Mn generally less than 2, preferably between 1.1 and 1.8, and often below 1.4; and (5) essentially complete conversion of monomer to polymer with the ability to continue polymerization upon addition of more monomer.

All polymerization reactions must be initiated. For some monomers, such as styrene for example, thermal self-initiation can occur without the need for additional reagents. For many other monomers, initiation may be accomplished by adding an agent to trigger one or more chemical reactions that ultimately produces an intermediate capable of propagating polymerization. These agents often are referred to as "initiators."

The type of initiators suitable for the present invention depend greatly on the details of the polymerization, including the mechanism for polymerization, the types of monomers being used, the type of control agent, the solvent system and the reaction conditions. Many different types of initiators have been investigated.

The initiator may be an initiator for polymerization by a free radical mechanism, such as RAFT or a related mechanism involving stable free radicals. Typically, suitable initiators for free radical polymerization are reagents or combinations of reagents that are capable of producing free radicals. Other methods for producing free radicals, including exposure to ionizing radiation ($^{60}$Co γ-rays), photochemical reactions, or sonication, will be evident to those of skill in the art as suitable methods for initiating free radical polymerization.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

Polymerization can also be initiated with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred for use in generating free radicals.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

An important aspect of the present invention is in-situ emulsification, which is achieved by reacting a "latent surfactant" with a "surfactant activator" to produce the surfactant for controlled emulsion polymerization. As used herein, the term "latent surfactant" refers to a compound or mixture of compounds that: (i) is soluble in a monomer-containing solution that is not miscible with water; and (ii) is not independently capable of producing a stabilized colloidal microemulsion at conventional surfactant levels from simple gentle mixing of the compound or mixture of compounds with monomer-containing solution and water. The term "surfactant activator" is used herein to describe a compound or mixture of compounds that: (i) is soluble in water; and (ii) is not independently capable of producing a stabilized colloidal microemulsion at conventional surfactant levels from simple gentle mixing of the compound or mixture of compounds with monomer-containing solution and water. For the present invention, water can be a reactant for in-situ emulsification reactions, but water alone cannot be the surfactant activator. The use of an in-situ emulsification technique in a controlled polymerization process that can be used in accordance with this invention is described in U.S. patent application Ser. No. 10/721,718, filed on Nov. 25, 2003. The teachings of U.S. patent application Ser. No. 10/721,718 are incorporated herein by reference in their entirety.

The fundamental principles for in-situ microemulsification are described by Prokopov and Gritskova (Russ. Chem. Rev 2001, 70, 791), who review its use in conventional free-radical polymerization of styrene using alkali-metal soaps prepared in situ via neutralization of fatty acids. As explained by Prokopov and Gritskova, the preparation of a carboxylate soap at a styrene-water interface during emulsification can produce a fine microemulsion because interfacial tension is decreased significantly by an abundance of emulsifier produced at the interface. By varying the nature of the carboxylic acid and the metal counter-ion used in the surfactant synthesis at the interface, it was possible to control the degree of dispersion and stability of the emulsion, as well as the resulting polystyrene latex produced via conventional free radical polymerization. In the present invention, the principles of in-situ microemulsification are expanded broadly to produce emulsions suitable for controlled polymerization via a wide range of methods utilizing conventional soap levels without added hydrophobes or specialized emulsification equipment.

In some embodiments, the surfactant for controlled polymerization may be produced by an acid/base neutralization reaction at the monomer/water interface. For some types of anionic surfactants, this may be accomplished, for example, via reaction of a monomer-soluble acid with an aqueous base, where the monomer-soluble acid is the latent surfactant and the base is the surfactant activator for in-situ emulsification. Suitable monomer-soluble acids include, for example, palmitic acid, oleic acid, dodecylbenzene sulfonic acid, lauryl sulfate, hexadecylsulfonic acid, dihexadecylphosphonic acid, hexadecylsuccinate half ester, and the monohexadecylamide of succinic acid. Suitable bases include, for example, hydroxides, carbonates and bicarbonates of alkali metal ions and quaternary ammonium ions, substituted and unsubstituted amines, and basic nitrogen-containing heterocycles. It will be evident to those skilled in the art that any aqueous base with a pKb less than about the pKa of the monomer-soluble acid also may be suitable. It also will be evident that hydroxides generated in situ via hydrolysis of moisture-sensitive compounds, such as sodium methoxide, sodium amide, potassium hydride and the like, also may be suitable as surfactant activators.

Many other reactions can be used to synthesize surfactants in situ, including for example those described in U.S. patent application Ser. No. 10/721,718 and the specific embodiments illustrated above are not intended to preclude any combination of latent surfactant/surfactant activator that produces a surfactant during emulsification. It will be evident to those skilled in the art that other latent surfactant/surfactant activator combinations may be suitable when the chemistries of surfactant synthesis and controlled polymerization are compatible.

The poly(4-vinylpyridine) produced by RAFT controlled polymerization in the presence of the RAFT agent may be isolated from the first polymerization medium using methods as are known in the art, including but not limited to filtration, dissolution and crystallization. The poly(4-vinylpyridine) is then protonated to produce a protonated poly(4-vinylpyridine) RAFT macroinitiator. Protonation of the poly(4-vinylpyridiene) may be accomplished, for example, using strong mineral acid such as hydrochloric acid and the like. The protonation may be accomplished by solubilization of the poly(4-vinylpyridine) in aqueous solution of the acid.

The protonated poly(4-vinylpyridine) RAFT macroinitiator is utilized in a second polymerization with at least one monomer containing ethylenic unsaturation to produce an amphiphilic block copolymer.

Suitable monomers containing ethylenic unsaturation for use in the second polymerization include at least one monomer selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N,N-dialkylacrylamide, N,N-dialkylmethacrylamide, isoprene, 1,3-butadiene, ethylene, vinyl acetate, vinyl chloride, vinylidene chloride, and combinations thereof. Functionalized versions of these monomers may also be used. Specific monomers or co-monomers that may be used in this invention and from which M is derivable include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), α-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl)ethyl 2-methyl-2-propenoate, 1-[2-[2-hydroxy-3-(2-propyl)propyl]amino]ethyl]-2-imidazolidinone, N-vinyl pyrrolidone, N-vinyl imidazole, crotonic acid, vinyl sulfonic acid, and combinations thereof.

In one embodiment, the monomer including ethylenic unsaturation is selected from styrene, isoprene and butadiene. In one embodiment, the monomer including ethylenic unsaturation is selected from styrene and butadiene.

An important aspect of the present invention lies in the "surfactantless" nature of the second polymerization step. That is, no additional surfactant either generated in-situ or otherwise, is present in the second polymerization step. The protonated poly(4-vinylpyridine) RAFT macroinitiator acts during the polymerization to produce a self-stabilizing block copolymer latex, without the need for additional surfactants as is the usual case.

The second polymerization is carried out at a temperature less than 100° C. This is an advantage over systems requiring higher reaction temperatures, owing to their more costly processing equipment and higher energy input.

The practice of this invention is further illustrated by the following examples which are intended to be representative rather than restrictive of the scope of the subject invention. Unless indicated otherwise, all parts and percentages are given by weight.

EXAMPLE 1

Preparation of Poly(4-vinylpyridine) By "In-situ" Emulsification Method with Dibenzyltrithiocarbonate (DBTTC) RAFT Agent A 500 ml three-necked round bottom flask equipped with a mechanical paddle stirrer, a nitrogen inlet, a pot thermometer, heating mantle and condenser was charged with 1.33 g (~0.00459 moles) of dibenzyltrithiocarbonate, 60.0 g (~0.57 moles) of distilled 4-vinylpyridine and 3.6 g (~0.0127 moles) of oleic acid. The stirred reactor was then purged with a slow bleed of nitrogen before adding an aqueous solution prepared by dissolving 0.36 g (~0.00133 moles) of potassium persulfate, 0.88 g (~0.0083 moles) of sodium carbonate, 0.88 g (~0.010 moles) of sodium bicarbonate and 0.82 g (~0.0126 moles) of potassium hydroxide in 158 g of reverse osmosis (RO) treated water. A yellow emulsion forms immediately. The emulsion is then rapidly heated to 65° C. and held there with the aid of a thermowatch controller. The progress of the polymerization was followed gravimetrically. After one hour the percent latex solids were 22.6 percent or 75 percent conversion. After 1.5 hours, the emulsion began to destabilized. Heating was continued for a total of 4 hrs. The resulting mixture was biphasic with a very viscous orange polymeric lower phase and an almost clear upper aqueous phase. The upper was decanted off and the lower polymer phase washed several times with water. After removing the excess water, the lower polymer phase was dissolved in ~200 ml of methanol. 290 g of methanol solution were isolated with a solids content of 20.0 percent. This represents a polymer yield of 58.0 g or 94.5 percent conversion of the 4-vinylpyridine. The theoretical Mn is 13,300 while the approximate Mn determined by NMR was ~11,000.

EXAMPLE 2

Preparation of Poly(4-vinylpyridine) By "In-situ" Emulsification Method with S-Benzyl-S'-(2-hydroxydecyl)trithiocarbonate (BHDTTC) RAFT Agent Procedure: same as Ex. 1 except that 1.80 g (~0.00464 moles) of BHDTTC RAFT agent used in place of DBTTC. After a 4 hr. reaction time at 65° C., the reaction was worked up in an identical manner to Ex. 1. 289 g of methanol solution at 19.66 percent solids represents 56.8 g of poly(4-vinylpyridine) or 92 percent conversion.

EXAMPLE 3

Preparation of Poly(4-VP+-b-PS-b-4-VP+) Triblock Copolymer Latex 50.0 g of 20 percent poly(4-vinylpyridine) methanol solution from Ex. 1 (~10.0 g of polymer) was placed in a 500 ml single neck flask and stripped of solvent on a rotary evaporator. To the dried polymer was then added 110 g of RO water and 10.0 g of con. hydrochloric acid. The mixture was stirred until a uniform pale yellow aqueous solution was obtained. This solution was then charged into a 500 ml three-necked round bottom flask equipped with a mechanical paddle stirrer, a nitrogen inlet, a pot thermometer, heating mantle and condenser. 0.6 g of potassium persulfate was then added followed by 30.0 g (~0.288 moles) of styrene. The biphasic stirred mixture was then rapidly heated to 65° C. under nitrogen for 8 hrs. The final latex solids were determined to be 26.7 percent (theory 27.1 percent) or 98.5 percent conversion. A small portion of the final latex was coagulated in dilute potassium hydroxide solution for analysis. NMR indicated a composition of 25.8 percent poly(4-VP) and 74.2 percent polystyrene (theory 25 percent poly(4-VP) and 75 percent PS). Latex particle size was ~182 nm.

EXAMPLE 4

Preparation of Poly(4-VP+-b-PS) Diblock Copolymer Latex 50.5 g of 19.66 percent poly(4-vinylpyridine) methanol solution from Ex. 2 (~10.0 g of polymer) was placed in a 500 ml single neck flask and stripped of solvent on a rotary evaporator. To the dried polymer was then added 110 g of RO water and 10.0 g of con. hydrochloric acid. The mixture was stirred until a uniform pale yellow aqueous solution was obtained. This solution was then charged into a 500 ml three-necked round bottom flask equipped with a mechanical paddle stirrer, a nitrogen inlet, a pot thermometer, heating mantle and condenser. 0.43 g of potassium persulfate was then added followed by 30.0 g (~0.288 moles) of styrene. The biphasic stirred mixture was then rapidly heated to 65° C. under nitrogen. After only 2 hrs., the latex solids were determined to be 27 percent (theory 27.1 percent) or ~100 percent conversion. A small portion of the final latex was coagulated in dilute potassium hydroxide solution for analysis. NMR indicated a composition of 24.8 percent poly(4-VP) and 75.2 percent polystyrene (theory 25 percent poly(4-VP) and 75 percent PS). Latex particle size was ~150 nm.

EXAMPLE 5

Repeat Preparation of Poly(4-vinylpyridine) By "In-situ" Emulsification Method with S-Benzyl-S'-(2-hydroxydecyl) trithiocarbonate (BHDTTC) RAFT Agent Procedure: same as Ex. 2 except at 2.23 scale factor. After a 4 hr. reaction time at 65° C., the reaction was worked up in an identical manner to Ex. 1. 505 g of methanol solution at 24.4 percent solids represents 123.2 g of poly(4-vinylpyridine) or 92 percent conversion.

EXAMPLE 6

Preparation of Poly(4-VP+-b-PS-b-NIPAM) Triblock Copolymer Latex 41 g of 24.4 percent poly(4-vinylpyridine) methanol solution from Ex. 5 (~10.0 g of polymer) was placed in a 500 ml single neck flask and stripped of solvent on a rotary evaporator. To the dried polymer was then added 110 g of RO water and 10.0 g of con. hydrochloric acid. The mixture was stirred until a uniform pale yellow aqueous solution was obtained. This solution was then charged into a 500 ml three-necked round bottom flask equipped with a mechanical paddle stirrer, a nitrogen inlet, a pot thermometer, heating mantle and condenser. 0.43 g of potassium persulfate was then added followed by 30.0 g (~0.288 moles) of styrene. The biphasic stirred mixture was then rapidly heated to 70° C. under nitrogen. After 3 hrs., the latex solids were 28.1 percent indicating essentially complete styrene conversion. At this point, 10.0 g (0.088 moles) of N-isopropylacrylamide monomer (NIPAM) were added to the hot latex and the reaction continued for an additional 2.5 hrs. The latex became very thick and was allowed to stand at room temperature overnight. The latex was then diluted with 100 ml of water and coagulated in dilute potassium hydroxide solution. After filtering, washing and drying, 47.5 g of polymer was isolated (theory 50.0 g) or 95 percent conversion. Dried material was completely soluble in dichloromethane. NMR analysis gave a wt percent composition of 18.7 percent 4-VP; 61.9 percent styrene; and 19.4 percent NIPAM. Calculated values are 20/60/20. SEC analysis against a polystyrene standard showed a unimodal peak with an Mn of 374,000 and a PDI of 1.47.

EXAMPLE 7

Preparation of Poly(4-VP+-b-SBR) Diblock Copolymer Latex 483 g of the methanol solution from Ex. 5 were stripped of the solvent and the residue dissolved in 1300 ml of RO water containing 118 g of conc. hydrochloric acid to prepare a 9.9 percent aq. solution of the protonated water-soluble poly(4-vinylpyridine) RAFT macroinitiator. One gram of potassium persulfate was then dissolved in 252.5 g of the 9.9 percent aq. macroinitiator solution (~25 g polymer). This solution was then charged into a one quart heavy-walled bottle preflushed with nitrogen, followed by the addition of 60.0 g (0.577 moles) of styrene and 90.0 g (~1.67 moles) of butadiene. The bottle was then capped and tumbled in a 65° C. water bath. The progress of the reaction was monitored gravimetrically by periodically sampling solids content by means of a syringe needle through a gasketed hole in the metal cap. After 23 hrs., the bottle was removed from the bath and cooled to room temperature to stop polymerization. The solids content was determined to be 32.3 percent or ~70 percent conversion of the styrene and butadiene.

EXAMPLE 8

Preparation of Poly(2-vinylpyridine) by Solution Polymerization Method with S-Benzyl-S'-(dodecyl)trithiocarbonate (BDTTC) RAFT Agent To a 500 mL round bottom flask equipped with mechanical stirrer, thermometer, and nitrogen inlet was charged 133 g 2-propanol, 65.5 g (620 mmoles) of 2-vinylpyridine, and 11.5 g (42 mmoles) of S-benzyl-S'-(dodecyl)trithiocarbonate. Flask was flushed with nitrogen and 1.5 g (6.1 mmoles) of 1,1'-azobis(cyclohexanecarbonitrile) in 23 g toluene. Solution was heated to reflux for 210 minutes. The final solids was 31.7 percent or a conversion of 95 percent, theoretical Mn was 2,470 experimental SEC Mn 2,940 g/mol.

EXAMPLE 9

Preparation of Poly(4-vinylpyridine) by Solution Polymerization Method with S-Benzyl-S'-(dodecyl)trithiocarbonate (BDTTC) RAFT Agent To a 500 mL round bottom flask equipped with mechanical stirrer, thermometer, and nitrogen inlet was charged 150 g 2-propanol, 55 g (524 mmoles) of 4-vinylpyridine, and 9.25 g (25 mmoles) of S-benzyl-S'-(dodecyl)trithiocarbonate and 0.63 g (4.4 mmoles) of 2,2'-azobis(2-methylpropionitrile). Solution was heated to reflux for 180 minutes. Solvent was evaporated off, yield 58.1 (91 percent). The theoretical Mn was 2,570, experimental SEC Mn 2,738 g/mol.

EXAMPLE 10

Preparation of Poly(2-VP+-b-ESBR) Copolymer Latex

Experiment was run in duplicate. To a 750 milliliter champagne bottle was charged a solution of 11.25 g of poly(2-vinylpyridine), 11.25 g of concentrated hydrochloric acid, 175 g of water, 1.5 g of potassium persulfate. The bottle was flushed with nitrogen and 60 g styrene followed by 90 g of butadiene was added. The bottles were capped, placed in a 65° C. water bath and tumbled for 21 hours. Percent solids were unchanged indicating no reaction occurred.

EXAMPLE 11

Preparation of Poly(2-VP+-b-ESBR) Copolymer Latex

Similar to Ex. 10 except 75 g styrene and 75 g of butadiene were charged. Percent solids were unchanged indicating no reaction occurred.

EXAMPLE 12

Preparation of Poly(4-VP+-b-ESBR) Copolymer

Experiment was similar to Ex. 10 except 11.25 g of poly (4-vinylpyridine) was charged. The final solids were 10 wt percent or 28 percent conversion of styrene and butadiene. Samples were combined and vented to release butadiene. Then 1000 mL water added and stripped under vacuum to remove residual styrene. The latex had a volume average particle diameter of 121 nm by light scattering.

To isolate the polymer 250 g latex was added with stirring to a coagulant of one part of Wingstay L dispersion, 20 g potassium hydroxide and 1200 mL of water. The crumb was filtered and dried under vacuum 25 millimeter Hg and 45° C. Isolated 58 grams of block copolymer. The Mn was 10,500 g/mol with PDI of 1.23. The glass transition range was −56.2 to −47.7° C.

EXAMPLE 13

Preparation of Poly(4-VP+-b-ESBR) Copolymer

Experiment was similar to Ex. 12. The latex had a volume average particle diameter of 127 nm by light scattering. Isolated 64 grams block copolymer. The Mn was 11,200 g/mol with PDI of 1.38. The glass transition range was −45.9 to −34.5° C.

While certain representative embodiments and details have been shown for the purpose of illustrating the invention, it will be apparent to those skilled in this art that various changes and modifications may be made therein without departing from the spirit or scope of the invention.

What is claimed is:

1. A method of producing an amphiphilic block copolymer, comprising the steps of:
   (1) preparing a first aqueous polymerization medium which is comprised of
       (a) 4-vinylpyridine,
       (b) a trithiocarbonate RAFT agent, and an emulsifier, wherein the emulsifier is prepared in-situ within the aqueous polymerization medium by the reaction of a latent surfactant with a surfactant activator;
   (2) polymerizing the 4-vinylpyridine within the first aqueous polymerization medium in the presence of a first free radical initiator to produce a poly(4-vinylpyridine);
   (3) protonating the poly(4-vinylpyridine) to form a protonated poly(4-vinylpyridine) RAFT macroinitiator;
   (4) preparing a second aqueous polymerization medium which is comprised of the protonated poly(4-vinylpyridine) RAFT macroinitiator and a monomer containing ethylenic unsaturation but is exclusive of a surfactant; and
   (5) polymerizing the protonated poly(4-vinylpyridine) RAFT macroinitiator and monomer containing ethylenic unsaturation within the second aqueous medium in the presence of a second free radical initiator and a temperature less than 100° C. to produce an amphiphilic block copolymer of the 4-vinylpyridine and monomer containing ethylenic unsaturation.

2. The method of claim 1, wherein the trithiocarbonate RAFT agent is of the structural formula:

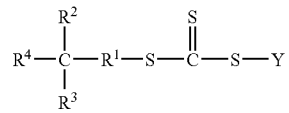

wherein $R^1$ is a divalent alkyl group of 1 to 12 carbon atoms, $R^2$ and $R^3$ are each independently hydrogen or an alkyl group of 1 to 12 carbon atoms, and $R^4$ is —OH or —COOH, with the proviso that the total carbon atoms of $R^1$, $R^2$, and $R^3$ is no greater than 12; and wherein Y represents a functional group that is capable of activating a vinylic carbon toward free radical addition.

3. The method of claim 2 wherein $R^1$ is $(CH_2)m$ where m ranges from 1 to 4.

4. The method of claim 2 wherein Y represents a function group selected from the group consisting of benzyl, picolyl, and t-butyl.

5. The method of claim 2, wherein $R^1$ is $(CH_2)_9$, $R^2$ and $R^3$ are hydrogen, $R^4$ is —COOH, Y is benzyl, and the free radical control agent is S-benzyl-S'-(11-undecanoic acid) trithiocarbonate.

6. The method of claim 2, wherein $R^1$ is $CH_2$, $R^2$ is $(CH_2)_7 CH_3$, $R^3$ is hydrogen, $R^4$ is —OH, Y is benzyl, and the free radical control agent is S-benzyl-S'-(2-hydroxydecyl) trithiocarbonate.

7. The method of claim 2, wherein $R^1$ is $CH_2$, $R^2$ is $(CH_2)_7 H_3$, $R^3$ is hydrogen, $R^4$ is —OH, Y is 4-picolyl, and the free radical control agent is S-(4-Picolyl)-S'-(2-hydroxydecyl) trithiocarbonate.

8. The method of claim 2, wherein the at least one monomer is butadiene and the amphiphilic block copolymer is poly(4-vinylpyridene-b-butadiene).

9. The method of claim 1 wherein the at least one monomer comprises butadiene and styrene and the amphiphilic block copolymer is poly (4-vinylpyridene-b-styrenebutadiene).

10. The method of claim 1 wherein the amphiphilic block copolymer is in the form of a stable latex that does not contain additional surfactant.

* * * * *